(12) United States Patent
Cash (10) Patent No.: US 8,639,594 B2
(45) Date of Patent: Jan. 28, 2014

(54) CASH MANAGEMENT OF SELF-SERVICE TRANSACTIONAL DEVICES

(75) Inventor: Charles Robert Cash, New Albany, OH (US)

(73) Assignee: NCR Corporation, Duluth, GA (US)

( * ) Notice: Subject to any disclaimer, the term of this patent is extended or adjusted under 35 U.S.C. 154(b) by 273 days.

(21) Appl. No.: 12/915,257

(22) Filed: Oct. 29, 2010

(65) Prior Publication Data

US 2012/0109791 A1    May 3, 2012

(51) Int. Cl.
*G07B 17/00*    (2006.01)
*G06Q 99/00*    (2006.01)

(52) U.S. Cl.
USPC .............................................. 705/30; 705/64

(58) Field of Classification Search
USPC ........................................................... 705/30
See application file for complete search history.

(56) References Cited

U.S. PATENT DOCUMENTS

| 7,996,324 B2 * | 8/2011 | Bishop et al. | 705/64 |
| 8,123,120 B2 * | 2/2012 | Couper et al. | 235/379 |
| 8,301,564 B2 * | 10/2012 | Mon et al. | 705/43 |

* cited by examiner

*Primary Examiner* — Garcia Ade
(74) *Attorney, Agent, or Firm* — Joseph P. Merhle (57) ABSTRACT

Devices and techniques for cash management of self-service transactional terminals are provided. Cash flow, cash holding cost, and cash service cost data, associated with one or more self-service transactional devices are received. An optimal cash reset value and associated interval between services calls may be calculated based on the cash flow data, the cash holding cost data, and the cash service cost data. The cash reset value being the amount of cash left in each of the one or more self-service transactional devices after a service call.

21 Claims, 4 Drawing Sheets

CASH MANAGEMENT OF SELF-SERVICE TRANSACTIONAL DEVICES

BACKGROUND

Institutions, including retail and financial institutions, operating devices containing cash have been faced with several difficulties in managing cash in these cash service point devices. These difficulties may include ensuring a device can service customers' cash needs as well as reducing costs associated with employee, or third party, interaction with the cash. Often, institutions have developed cash management strategies including, for example, auditing the cash in the devices daily, or more often. Frequent auditing is often necessary to reduce costs associated with theft, or human errors, by employees handling the cash in customer transactions, like, for example, at a point of sale cash register attended by a cashier. Further, replenishment of cash within the cash devices, is often carried out on a schedule, and to an amount, dictated by industry norms for a given institution and device type (e.g., a bank automatic teller machine). Variations to these norms, for example replenishing a given device more often, often occur through trial and error which may also increase costs. Thus, managing cash in these cash service point devices is often an expensive and time consuming process.

SUMMARY

In various embodiments, systems and methods for cash management of self-service transactional devices are presented. According to an embodiment, a method for cash management of self-service transactional devices is provided. In a system having one or more self-service transactional devices ("SSTDs"), cash flow data associated with the one or more SSTDs is received. Cash holding cost data associated with the one or more SSTDs is received. Cash service cost data associated with the one or more SSTDs is received. Next, an optimal cash reset value and associated interval between service calls is calculated based on the cash flow data, the cash holding cost data, and the cash service cost data. The cash reset value being the amount of cash left in each of the one or more SSTDs after a service call.

BRIEF DESCRIPTION OF THE DRAWINGS

Some embodiments are illustrated by way of example and not limitation in the figures of the accompanying drawings in which.

DETAILED DESCRIPTION

Example methods and systems for cash management of self-service transactional devices are described. In the following description, for purposes of explanation, numerous specific details are set forth in order to provide a thorough understanding of an embodiment of the present disclosure. It will be evident, however, to one of ordinary skill in the art that the present disclosure may be practiced without these specific details. For example, although many examples discussed below will resemble automatic teller machines ("ATMs"), the systems and methods are equally applicable to, for example, item dispensers that accept cash as payment and dispense cash as change.

Institutions looking to reduce costs associated with customer cash transactions may turn to self-service transactional devices, such as self-checkout terminals and transactional kiosks, to reduce the interaction of employees and cash during customer transactions. Although using such self-service transactional devices ("SSTDs") helps to reduce losses due to employee theft or ineptitude, the cash reserves of the device must still be managed. An institution's goals with respect to the SSTDs may include ensuring that there is enough cash in an SSTD to meet a customer's cash needs for a transaction (e.g., adequate cash to fulfill a withdrawal from an ATM) while reducing cost associated with maintaining the SSTD. However, most institutions reliance on industry standards for a given device type, possibly supplemented by trial and error adjustments, often fail to meet these goals. A different approach is needed.

Treating cash in SSTDs as inventory, instead of merely trying to keep the cash repository in an SSTD full, allows the development of models which may be optimized to reduce costs for institutions. For example, a total cost for managing SSTDs may be built on the deterministic economic order quantity inventory model described in WAYNE L. WINSTON, OPERATIONS RESEARCH, APPLICATIONS & ALGORITHMS (PWS-Kent publishing Company 1991) (1987). However, the order quantity inventory model must be suitably extended to account for the unique characteristics of SSTDs. Thus, starting with inventory management research and extending it to properly model SSTDs may allow institutions managing SSTDs to finally realize savings in time and money.

Figure 2A:
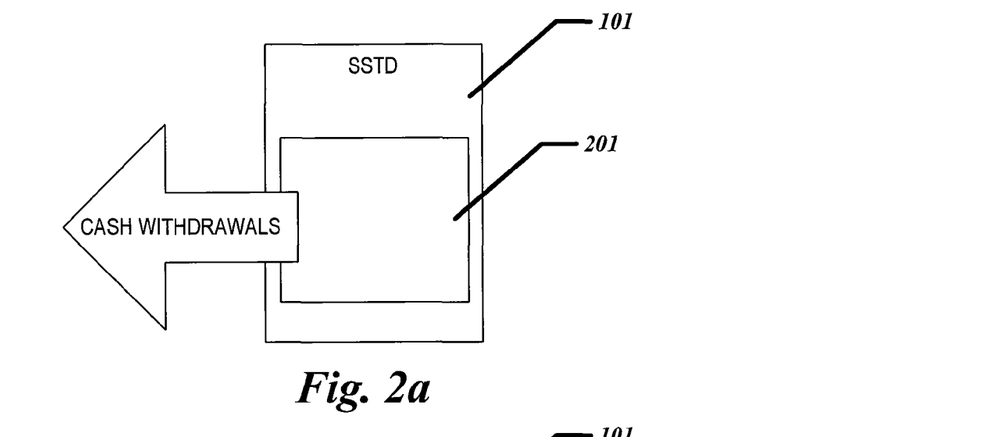
FIGS. 2*a*-2*c* are block diagrams illustrating examples of three categories of self-service transactional devices according to one embodiment.

To illustrate the concept of treating SSTD cash as inventory to reduce costs, a Total Cost equation, derived from WAYNE L. WINSTON, OPERATIONS RESEARCH, APPLICATIONS & ALGORITHMS, for managing cash in a category one SSTD, described with respect to FIG. 2*a*, is given below as a function of the amount of cash in the SSTD.

$$TC(Q) = \frac{KD}{Q^2} + \frac{HQ}{2} \qquad \text{eq. 1}$$

The terms for eq. 1 are as follows:

Q is an amount of cash.

K is the replenishment cost. Example components of K may include employee wages in replenishing an SSTD and any consumables used in the servicing (e.g., fuel costs to transport the cash and employees to the SSTD, packaging, etc.). K may be expressed in cost per replenishment (e.g. U.S. dollars per replenishment).

D is the demand for cash in terms of amount of cash per period of time. In some examples D may be a constituent of cash flow for an SSTD. In some examples, D may be demand over a predetermined period, such as a year, a month, etc. In some examples, the predetermined period of time may be such that the demand for cash is similar across the period (e.g., seasonality is not a factor). In some examples, D may be expressed as a single currency, such as U.S. dollars. In some examples, D may be a function of the denominations of a currency. For example, using U.S. dollars as the currency, a different D may be used to represent one, five, ten and twenty dollar denominations common in SSTDs. Further, coinage may also be split by denomination. Splitting by denomination may provide greater cost savings as some denominations are typically in higher demand than others.

His the holding cost for cash. In some examples H may include the opportunity cost of capital, security cost, or risk. In some examples H may be expressed as a percentage of Q. In some examples, components of H may be specific to a given SSTD or group of SSTDs (e.g., the cost of insuring the SSTDs and the cash therein), while other components may be institution wide (e.g., the possible interest, or float, on the cash residing in an SSTD).

In some examples, some of the constituents of K, D, or H may be specific to a particular SSTD while others may be aggregated from multiple SSTDs in an institution, or taken from the operational parameters of the institution itself (e.g., cost structures of the institution, or investment opportunities). In some examples, the SSTDs used in an aggregate may be limited to a retail location, a geographic boundary (e.g., a state), or other factor to control the relevance of SSTD data used in the constituents of K, D, or H.

Modeling the total cost of cash in SSTDs, as shown in eq. 1, provides the opportunity discover optimizations in various aspects of the model. For the purposes of discussion throughout this document, it will be understood that optimization, or optimal, means a result which is best under a set of particular objectives and constraints. For example, while a model may be solved, for example, for an amount of cash in an SSTD which minimizes costs, it will be understood that the model may not represent each and every aspect of the management of the SSTD, and so another solution may exist which provides even greater cost savings. Accordingly, if processing time, or other constraints, demand a less detailed model, then an optimal solution may be worse than an objectively optimal solution.

The total cost model shown in eq. 1 may be solved to determine the optimal cash order amount that minimizes TC(Q). The equation below illustrates an example of such a solution, where Q* is the optimal cash order amount, and the other terms are the same as in eq. 1:

$$Q^* = \sqrt{\left(\frac{2KD}{H}\right)} \qquad \text{eq. 2}$$

Additionally, given Q*, the number of time units between replenishments may be given by the following equation, where N is the number of time units (e.g., days), PN is the number of time units in the predetermined period of time used in D (e.g., if the predetermined period of time is a year, and N represents days, then PN would be 365), and the remaining terms are the same as in eqs. 1 and 2:

$$N = PN\frac{Q^*}{D} \qquad \text{eq. 3}$$

An institution may use Q* and N to direct servicing of SSTDs, reducing costs associated with managing the SSTDs without the needless cost in time and money associated with current practices. In some examples, N may be rounded to an integer to represent operational conveniences. For example, if N represents days, then it may be round up to coincide with the end of a day. In some examples, just as D accounts for differences in demand for denominations of a currency, Q* may also be divided based on currency denominations. In some examples, denominational differences of Q* may be rounded to operational conveniences. For example, a given coin denomination (e.g., quarters) may be rounded such that the amount equals a multiple of the coins in a roll of coins (e.g., standard coin count) for that denomination. In some examples, the rounding, or adjusting, of N may drive an adjustment of Q*.

By utilizing models, such as those expressed in eqs. 1-3, an institution may reduce costs associated with managing SSTDs by calculating an optimal cash reset value and associated interval between service calls (replenishment) based on cash flow data, cash holding cost data, and cash service cost data for the SSTDs.

Figure 1:
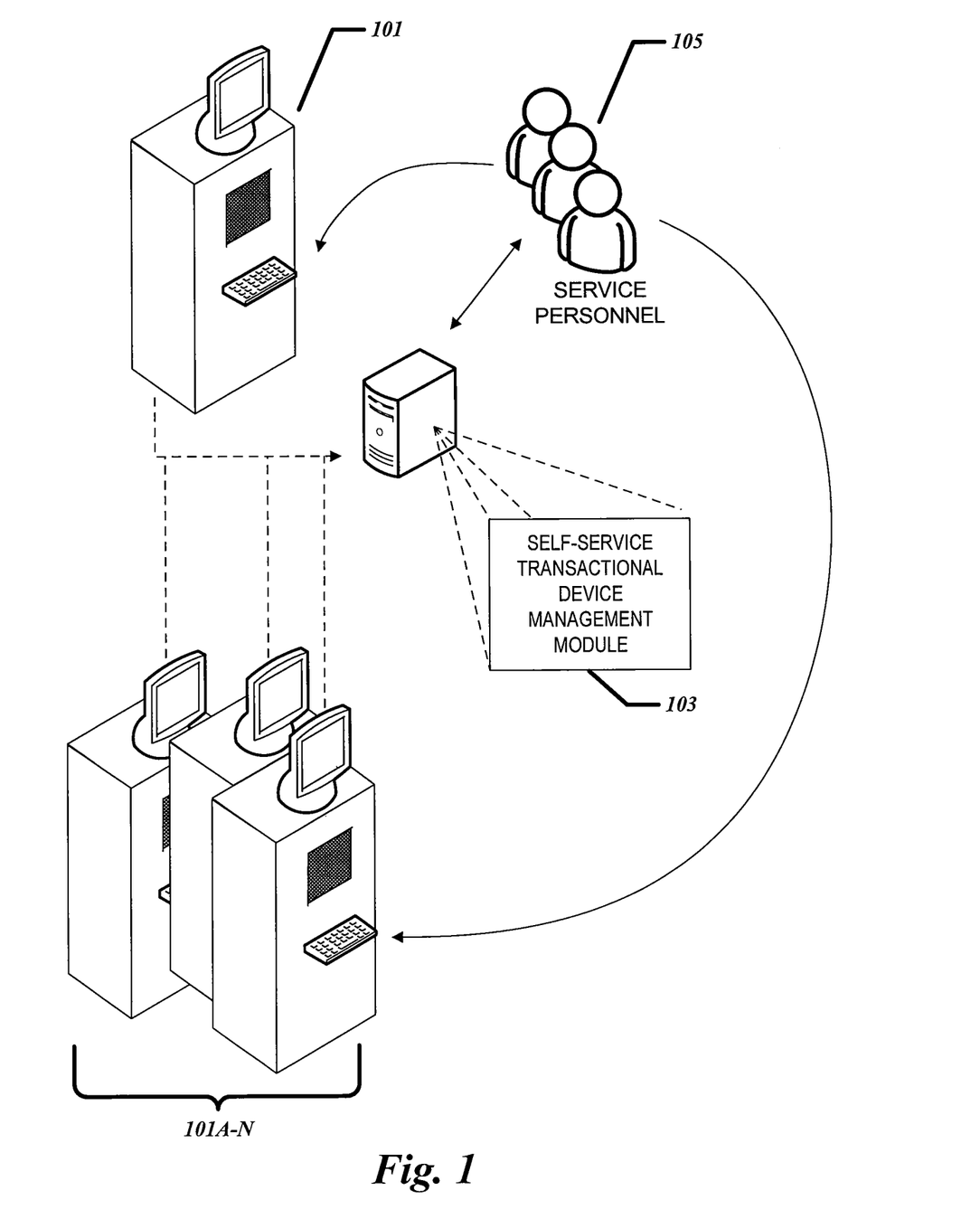
FIG. 1 is a block diagram illustrating an example system for cash management of self-service transactional devices according to one embodiment.

FIG. 1 is a block diagram illustrating an example system 100 for cash management of self-service transactional devices according to one embodiment. System 100 may include one or more SSTDs 101, 101A-N, and a self-service transaction device management module 103 ("SSTD management module"). The SSTDs 101, 101A-N may be serviced by service personnel 105.

SSTDs 101, 101A-N may be several different types of devices, such as ATMs, self-service checkout ("SCO") lanes, or item dispenser devices, for example. However, SSTDs 101, 101A-N, for the purposes herein, fall into one of four categories: dispense only devices; dispense and deposit devices; dispense and deposit devices with cash recycling; and deposit only devices. In some examples, the SSTDs 101, 101A-N may be grouped according to device category. In some examples, a common cash reset value and associated interval are applied to SSTDs 101, 101A-N. In some examples, each of SSTDs 101, 101A-N, have a separate cash reset value and associated interval applied. In some examples, SSTDs 101, 101A-N, optionally configured to report various metrics pertaining to cash flow data in response to an event. In some examples the event may include receiving a report request, arrival of a predetermined reporting period (e.g., at the end of a day or month), the cash repository has filled (e.g., in the cash of a deposit category device), or the repository has emptied. In some examples, SSTDs 101, 101A-N may be communicatively coupled to the SSTD management module 103, via, for example, the internet, a cellular network, or other communications mechanisms, to report the various metrics directly to the SSTD management module 103.

The SSTD management module 103 may be configured to receive cash flow data, cash holding cost data, and cash service cost data associated with the SSTDs 101, 101A-N. In some examples, the SSTD management module 103 may include one or more user or programmatic interface to receive the data. In some examples, the SSTD management module 103 may include a retrieval service configured to connect to external data sources in order to obtain at least of portion of the cash flow data, cash holding cost data, or cash service cost data. In some examples, SSTD management module 103 may also include one or more output interfaces to help direct the service personnel 105. For example, the SSTD management module 103 may include a user interface indicating a schedule of when to service each SSTD 101 or a group of SSTDs 101A-N. In some examples, the SSTD management module 103 may include a communications module to communicate the optimization data to an external system (e.g., a work order scheduling system) to direct the service personnel 105. By following the direction provided by the SSTD management module 103, service personnel, and thus an institution, may reduce costs associated with managing SSTDs.

Figure 2B:
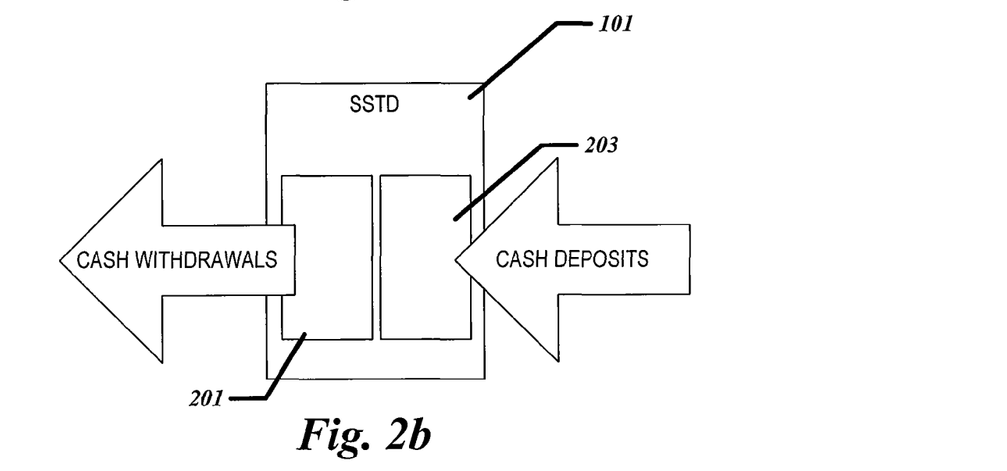
Figure 2C:
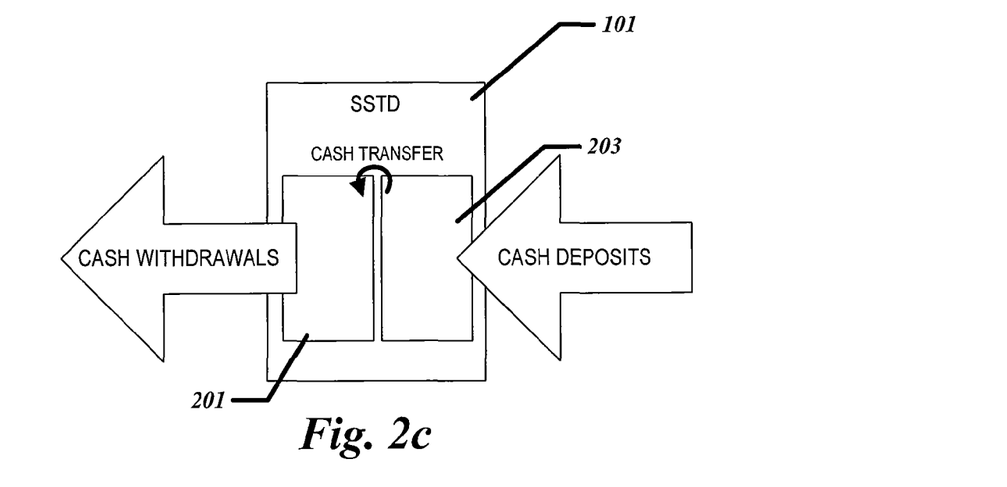

As previously indicated, SSTDs 101, 101A-N fall into one of four categories: dispense only devices; dispense and deposit devices; dispense and deposit devices with cash recycling; and deposit only devices. FIGS. 2*a*-2*c* are block diagrams illustrating examples of the first three categories of self-service transactional devices according to one embodiment. Deposit only devices may be treated similarly to dispense only devices and so are not here separately addressed. In some examples, a different total cost model is applied to each category of SSTD 101. In some examples, terms from eq. 1 include different, or additional, components based on models for a particular category. For example, SSTDs 101 which receive deposits may include both demand and receipt demand components to the cash flow data associated with the SSTDs 101.

FIG. 2*a* illustrates an example dispense only SSTD 101, which may be known as a category one SSTD 101. The SSTD 101 may include a cash repository 201 to contain all cash it may dispense between service calls. In modeling total cost for a category one SSTD 101, eq. 1, for example, may be used. Cash flow data for category one SSTD 101 may constitute cash demand data and not receipt demand data. Accordingly, an optimized cash reset value and associated interval between service calls may be calculated with eqs. 2 and 3, for example. In some examples, the model for a category one SSTD 101 may be applied to a category four SSTD 101, or a deposit only device. In such examples, the cash demand data may be replaced with cash receipt demand data and the optimal cash reset value may instead represent the level of cash in the repository 201, which may be lower than the repository's 201 capacity. Thus, deciding when to initiate a service call will balance the cost of holding the cash, versus the cost of servicing the SSTD 101. In some examples, an institutional objective to ensure cash is available for outlying cash demands (e.g., an unexpected surge in cash withdrawals due to a special event), may cause the amount of cash considered in the holding cost data to be attenuated by a safety net value. For example, in a cash machine that can hold $100, $20 may be removed from consideration for the holding cost data, the $20 being the safety-net. Because the $20 is withheld from the holding cost data, it is treated as free (or near free) and thus the cost of a service call will outweigh maintaining the $20 in the cash machine. Accordingly, the $20 may provide a cushion to unexpected demand and allow the cash machine to continue to serve customers.

FIG. 2*b* illustrates an example dispense and deposit SSTD 101, which may be known as a category two SSTD 101. A category two SSTD 101 may include a deposit repository 203 which is separate from a dispense repository 201. In some examples, the total cost model of a category two SSTD 101 may be expressed in the following equation, eq. 4, where R is a cash receipt demand, in terms of cash amount per time period, component of cash flow data, and the remaining terms are the same as in eq. 1, with the time periods for D and R being equivalent.

$$TC(Q) = \frac{KD}{Q} + H\left(\frac{Q}{2}\right)\left(1 + \frac{R}{D}\right) \quad \text{eq. 4}$$

Following eq. 4, an alternative optimal cash reset value (assuming that deposits are completely removed with each service call), may be expressed in the following equation:

$$Q^* = \sqrt{\left(\frac{2KD^2}{H(D+R)}\right)} \quad \text{eq. 5}$$

As illustrated in eqs. 4 and 5, including deposits influences the holding cost of cash in an SSTD 101, thus making more frequent servicing more likely. Other considerations, such as not filling the deposit repository 203 to ensure customer use of the SSTD 101 may influence various components of the terms used in eq. 4.

FIG. 2*c* illustrates an example dispense and deposit SSTD 101 including cash recycling, which may be known as a category three SSTD 101. In some examples, cash recycling may be understood as the use, by the SSTD 101, of deposited funds for dispensing purposes. For example, if a $20 were deposited with an SSTD 101, that same $20 bill may be used in a later dispensing operation. Category three SSTDs 101, in some examples, may include separate dispense 201 and deposit 203 repositories with a cash transfer process from the deposit repository 203 to the dispense repository 201, as shown in FIG. 2*c*. In some examples, the category three SSTD 101 may include a single repository wherein the deposit functionality properly accounts for deposits and then makes the deposited cash available for dispensing. In some examples, individual currency denominations may be stored within rolls or drums. In some examples, roll capacity is based on the length of the "long side" of a note.

In some examples, the models previously discussed with respect to category one or two SSTDs 101 may be used with category three SSTDs 101 with some modification. For example, cash receipt demand data may be used to modify cash demand data by attenuating cash demand data to the extent cash is received. Thus, if actual cash demand were $50 a day, and receipt demand were $30 per day, receipt demand may be considered zero while cash demand may be considered to be $20 per day. Conversely, if receipt demand outstrips cash demand, the cash receipt demand data may be attenuated by the cash demand data. These may be respectively known as cash negative and cash positive demand devices. In some examples, when the model separates currency denominations, mixed results may occur and thus the effect of cash demand versus cash receipt demand may became more complicated. For example, if a SSTD 101 accepts $5, $10, and $20 denominations for deposits, and $1, $5, and $10 denominations for dispensing, receipt if $20 and dispensation of $1 denominations may be modeled based on the category one models because there is no overlap between the dispensing and receiving denominations. Further, the denominations in which overlap occurs may be modeled using the category two models. In some examples, where rolls or drums are used to store currency denominations, D and R may be converted from a cash value to a number of notes before calculations are made.

Figure 3:
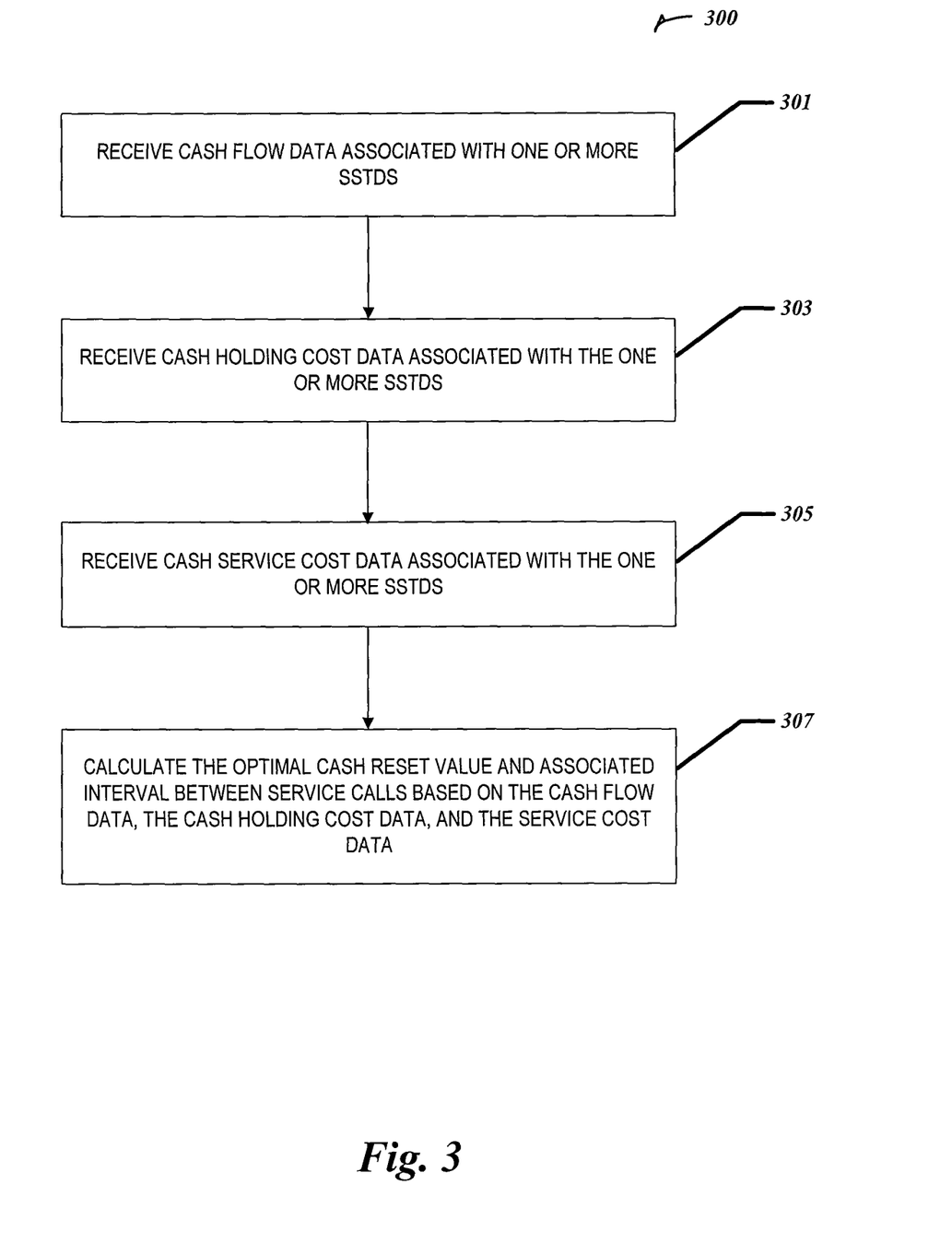
FIG. 3 is a flowchart illustrating an example method of cash management of self-service transactional devices according to one embodiment.

FIG. 3 is a flowchart illustrating an example method of cash management of self-service transactional devices according to one embodiment. Components from the example system 100 may be used to implement the method described below, such as the SSTD management module 103. However, it will be recognized that alternative components may also be used.

At 301 cash flow data associated with the one or more SSTDs 101 is received. In some examples, the cash flow data contains a cash demand data over a predetermined period of time. In some examples, the predetermined period of time is a year, a month, or other period in which cash demand is similar throughout. In some examples, the cash flow data includes cash receipt demand data, of cash deposited in an SSTD 101. In some examples, cash demand data is attenuated by cash receipt demand data. In some examples cash receipt demand data is attenuated by cash demand data. In some examples, cash flow data is split up amongst currency denominations. For example, cash demand data may include the rate at which a $5 note is demanded and a different rate for a $10 note. In some examples, the SSTDs 101 may report cash demand data in response to an event. In some examples the event may be receipt of a report request, arrival of a predetermined reporting period, or the filling or emptying of a repository 201, 203. In some examples, at least a portion of the cash flow data is transmitted from the SSTDs 101. In some examples, SSTDs 101 report directly to, for example, a SSTD management module 103 to which they are communicatively coupled. In some examples at least a portion of the cash flow data originates from a central repository of reported cash flow values.

At 303 cash holding cost data is received. In some examples, cash holding cost data may include institution wide components, such as, opportunity cost of the cash (e.g., lost float, reduced reserves for purchases). In some examples, cash holding cost data may include components associated with the location of the SSTD 101. For example, insurance costs, and use of cash reserves may be localized to a particular location, a store, or a region which is smaller than the institution as a whole and expresses unique characteristics. In some examples, holding cost data is expressed as a percentage applied to a quantity of cash. In some examples, a portion of a quantity of cash in a given SSTD 103 may be withheld when applying the holding cost percentage. In some examples, cash received from deposits may be considered in holding cost data. In some examples, cash holding cost data accounts for different holding costs between currency denominations used.

At 305 cash service cost data is received. In some examples, cash service cost data may include employee wage data for the employees involved in service calls. In some examples, the cash service cost data includes consumables (e.g., fuel, packaging, etc.) used in each service call. In some examples, the cash service cost data includes time to balance and reconcile cash added to or removed from the SSTD 101.

At 307 an optimal cash reset value and associated interval between service calls is calculated based on the cash flow data, the cash holding cost data and the cash service cost data. The cash reset value being the amount of cash left in each of the one or more SSTDs after a service call. In some examples, a separate calculation is conducted for two or more categories of SSTDs 101. In some examples, for category one SSTDs 101, optimal cash reset value is equal to eq. 2 and the associated interval between service calls is equal to eq. 3. In some examples, for category two SSTDs 101, optimal cash reset value is equal to eq. 5 and the associated interval between service calls is equal to eq. 3, given Q* and D calculated from eq. 5. In some examples, for category four SSTDs 101, as for category one SSTDs 101, optimal cash reset value is equal to eq. 2 and the associated interval between service calls is equal to eq. 3, after the cash receipt demand data is eliminated and the cash demand data is attenuated by the eliminated cash receipt demand data. In some examples, each denomination of currency is separated in the calculation. In some examples, for category three SSTDs 101, a mixed approach, utilizing one or both methodologies of category one or category two SSTDs 101 may be employed as previously described with respect to FIG. 2c.

The calculated optimal cash reset value and associated interval between service calls may be communicated to service personnel 105 via various mechanisms. For example, via user interface displaying a schedule of SSTD 101 amounts and times for service. In some examples, the calculations may be communicated to a central work order system to direct the service personnel 105.

Figure 4:
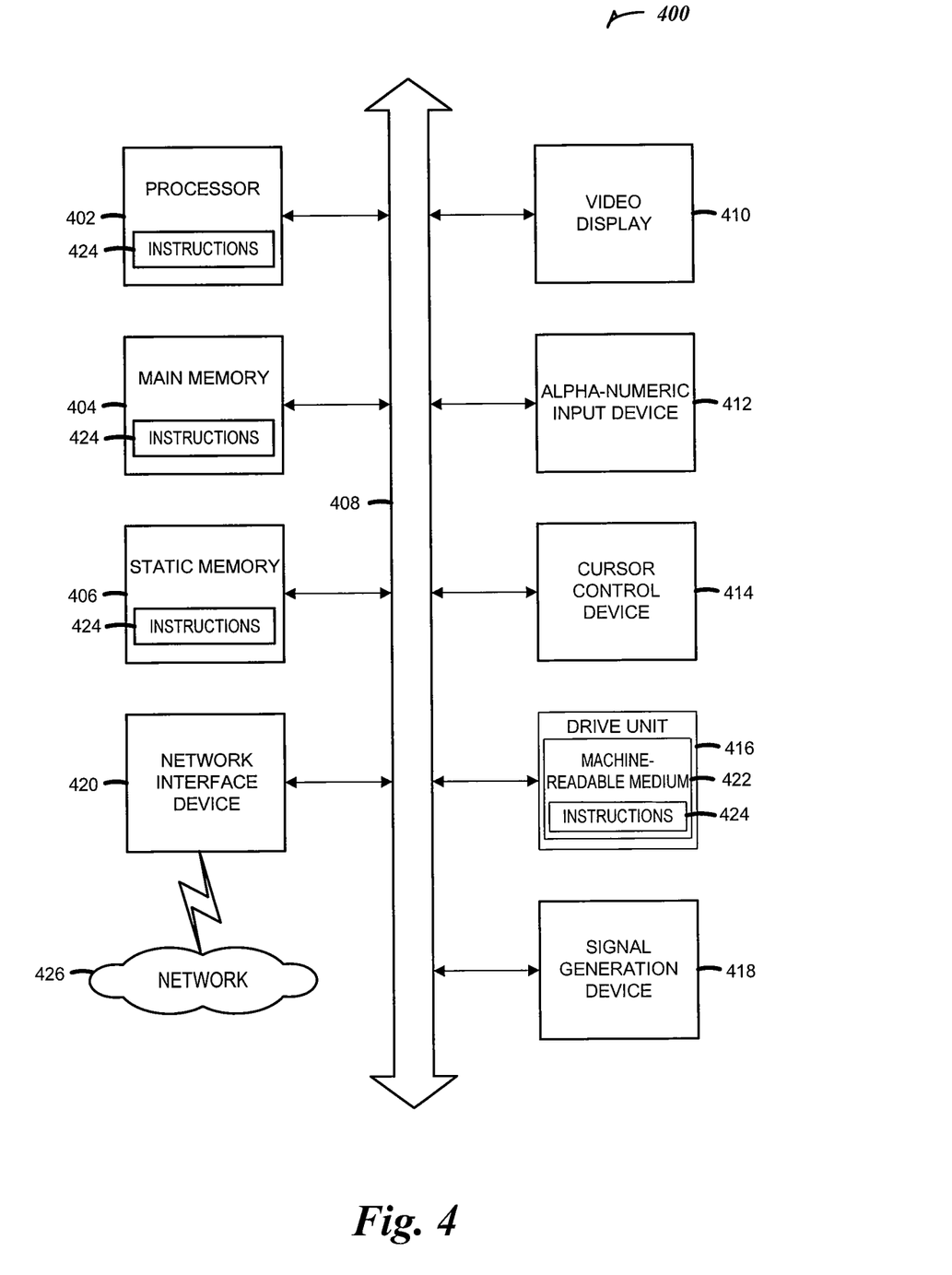
FIG. 4 is a diagrammatic representation illustrating a machine in the example form of a computer system which may be may be part of an example embodiment.

FIG. 4 shows a diagrammatic representation of machine in the example form of a computer system 400 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 400 includes a processor 402 (e.g., a central processing unit (CPU) a graphics processing unit (GPU) or both), a main memory 404 and a static memory 406, which communicate with each other via a bus 408. The computer system 400 may further include a video display unit 410 (e.g., a liquid crystal display (LCD) or a cathode ray tube (CRT)). The computer system 400 also includes an alphanumeric input device 412 (e.g., a keyboard), a cursor control device 414 (e.g., a mouse), a disk drive unit 416, a signal generation device 418 (e.g., a speaker) and a network interface device 420.

The disk drive unit 416 includes a machine-readable medium 422 on which is stored one or more sets of instructions (e.g., software 424) embodying any one or more of the methodologies or functions described herein. The software 424 may also reside, completely or at least partially, within the main memory 404 and/or within the processor 402 during execution thereof by the computer system 400, the main memory 404 and the processor 402 also constituting machine-readable media.

The software 424 may further be transmitted or received over a network 426 via the network interface device 420.

While the machine-readable medium 422 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the inventive subject matter. The term "machine-readable medium" shall accordingly be taken to include, but not be limited to, solid-state memories, optical and magnetic media, and carrier wave signals. The term "tangible machine-readable medium" shall be taken to include, machine-readable media that is in tangible form, including, but not limited to, solid-state memories, optical media, and magnetic media.

EXAMPLE

An example application of some techniques described herein is given below. The example is given to illustrate cash management of self-service transactional devices, but in no way is intended to limit the scope of the subject matter discussed above.

A retailer operating a store with four SCO lanes, with a cash management policy directing it to replenish, balance, and reconcile cash at each SCO lane daily, using a common reset balance of $2,000 per lane (broken down into specific quantities of coins and bills), may have an estimated cash management cost for these SCO lanes of approximately $8,600 per year. This annual cash management cost is based on the following: flow, holding cost, and servicing cost cash data. An estimated time required to replenish (and reset) cash at a SCO lane may be, on average, about 5 minutes per lane. For control and security purposes, the retailer may require two associates, typically a cash office associate and a store front-end manager, to perform the SCO lane replenishment task. An average loaded hourly labor cost for these associates may be $15 per hour. An estimate for the holding cost of cash may be 20% per year (accounting for cost of capital and additional risk of having cash in a retail area) with an annual cash demand may be $395,700 per SCO lane. Extending this example further, what if this retailer had 2,000 similar stores with four SCO lanes per store, then the annual enterprise SCO cash management cost would be approximately $17.2 million ($8600×2000).

A preliminary analysis using the concepts outlined above may result in a new policy to replenish SCO lanes every three days and with a reset balance of $3,235.50 (with different quantities of coins and bills than current policy). The estimated annual cost of managing cash at SCO lanes in this store would then be $5,100 (a savings of $3,500 per year). If this retailer had 2,000 similar stores with four SCO lanes per store, then the annual enterprise SCO cash management cost, using this new policy, would be $10.2 million (or a savings of $7 million per year over the retailer's current cash management policy).

The untapped cash management benefits from self-service transactional devices can significantly reduce an institution's operational costs and may accelerate future self-service deployments. An institution using the disclosed cash management for self-service transactional devices may avoid the time and expense of guessing, or adhering to traditional cash management policies associated with these devices, and move directly to reducing costs by accurately modeling the cash needed in each device over time.

The Abstract of the Disclosure is provided to comply with 37 C.F.R. §1.72(b), requiring an abstract that will allow the reader to quickly ascertain the nature of the technical disclosure. It is submitted with the understanding that it will not be used to limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A system comprising:
   one or more self-service transactional devices (SSTDs), each of the one or more self-service transactional devices including a repository to hold cash; and
   one or more hardware processors;
   a SSTD management module configured to:
      receive, using the one or more hardware processors, cash flow data associated with the one or more SSTDs;
      receive cash holding cost data associated with the one or more SSTDs;
      receive cash service cost data associated with the one or more SSTDs; and
      calculate an optimal cash reset value and associated interval between service calls based on the cash flow data, the cash holding cost data, and the cash service cost data, the cash reset value being the amount of cash left in each of the one or more SSTDs after a service call.

2. The system of claim 1, wherein the cash flow data includes cash demand data over a predetermined period of time.

3. The system of claim 2, wherein the one or more SSTDs are cash dispensing devices that do not accept cash deposits.

4. The system of claim 2, wherein the one or more SSTDs are cash dispensing and cash depositing devices that both dispense cash and accept cash deposits, and wherein the cash flow data further includes cash receipt demand data over the predetermined period of time.

5. The system of claim 4, wherein the repository of each of the SSTDs separating cash to dispense from cash received from deposits, the cash received from deposits being unavailable to dispense, the cash from deposits considered in the cash holding cost data.

6. The system of claim 4, wherein the one or more SSTDs are cash dispensing and cash depositing devices, cash received from deposits being available to dispense, wherein. the cash flow data further includes cash receipt demand data over the predetermined period of time, and wherein the cash receipt demand data attenuates the cash demand data to the extent that the cash received replaces cash dispensed.

7. The system of claim 1, wherein the cash flow data includes data on each denomination of cash capable of being dispensed in the one or more SSTDs.

8. The system of claim 3, wherein the optimal cash reset value is equal to $$\sqrt{\left(\frac{2KD}{H}\right)};$$

wherein K is a service call cost, D is cash demand, and H is holding cost expressed as a percentage of the cash in the repository of each of the one or more SSTDs;
wherein the associated interval between service calls is equal to $$n\frac{Q^*}{D};$$

and
wherein Q* is the optimal cash reset value, and n the predetermined time expressed in subunits of the predetermined time.

9. The system of claim 1, wherein the one or more SSTDs are communicatively coupled to the SSTD management module and configured to report cash flow data in response to an event.

10. The system of claim 9, wherein the event is at least one of receiving a report request, arrival of a predetermined reporting period, the repository has filled, or the repository has emptied.

11. In a system having one or more self-service transactional devices (SSTDs) each including a repository to hold cash, a method comprising:
receiving, using one or more hardware processors, cash flow data associated with the one or more SSTDs;
receiving cash holding cost data associated with the one or more SSTDs;
receiving cash service cost data associated with the one or more SSTDs; and
calculating an optimal cash reset value and associated interval between service calls based on the cash flow data, the cash holding cost data, and the cash service cost data, the cash reset value being the amount of cash left in each of the one or more SSTDs after a service call.

12. The method of claim 11, wherein the cash flow data includes cash demand data over a predetermined period of time.

13. The method of claim 12, wherein the one or more SSTDs are cash dispensing devices that do not accept cash deposits.

14. The method of claim 12, wherein the one or more SSTDs are cash dispensing and cash depositing devices that both dispense cash and accept cash deposits, and wherein the cash flow data further includes cash receipt demand data over the predetermined period of time.

15. The method of claim 14, wherein the repository of each of the SSTDs separating cash to dispense from cash received from deposits, the cash received from deposits being unavailable to dispense, the cash from deposits considered in the cash holding cost data.

16. The method of claim 14, wherein the one or more SSTDs are cash dispensing and cash depositing devices, cash received from deposits being available to dispense, wherein the cash flow data further includes cash receipt demand data over the predetermined period of time, and wherein the cash receipt demand data attenuates the cash demand data to the extent that the cash received replaces cash dispensed.

17. The method of claim 11, wherein the cash flow data includes data on each denomination of cash capable of being dispensed in the one or more SSTDs.

18. The method of claim 13, wherein the optimal cash reset value is equal to $$\sqrt{\left(\frac{2KD}{H}\right)};$$

wherein K is a service call cost, D is cash demand, and H is holding cost expressed as a percentage of the cash in the repository of each of the one or more SSTDs;
wherein the associated interval between service calls is equal to $$n\frac{Q^*}{D};$$

and
wherein Q* is the optimal cash reset value, and n the predetermined time expressed in subunits of the predetermined time.

19. The method of claim 11, wherein to receive cash flow data includes reporting, by each of the SSTDs, cash flow data in response to an event.

20. The method of claim 19, wherein the event is at least one of receiving a report request, arrival of a predetermined reporting period, the repository has filled, or the repository emptied.

21. A non-transitory computer readable medium containing instructions that, when executed by one or more hardware processors, cause a machine to perform a method, the method comprising:
receiving, using one or more hardware processors, cash flow data associated with one or more self-service transactional devices (SSTDs);
receiving cash holding cost data associated with the one or more SSTDs;
receiving cash service cost data associated with the one or more SSTDs; and
calculating an optimal cash reset value and associated interval between service calls based on the cash flow data, the cash holding cost data, and the cash service cost data, the cash reset value being the amount of cash left in each of the one or more SSTDs after a service call.

* * * * *